United States Patent
Schlick et al.

(10) Patent No.: US 11,995,670 B2
(45) Date of Patent: May 28, 2024

(54) USER EXPERIENCE MANAGEMENT SYSTEM

(71) Applicant: Express Scripts Strategic Development, Inc., St. Louis, MO (US)

(72) Inventors: Emily T. Schlick, Ballwin, MO (US); Tyler Corbett, Creve Coeur, MO (US); Clinton R. Laytham, Bel-Nor, MO (US); Alexander Chea, Boca Raton, FL (US); Alison Bodker, Cudahy, WI (US); Kalynn Clinton, St. Louis, MO (US); Kathryn Golden, Austin, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 93 days.

(21) Appl. No.: 17/337,071

(22) Filed: Jun. 2, 2021

(65) Prior Publication Data

US 2021/0374778 A1    Dec. 2, 2021

Related U.S. Application Data

(60) Provisional application No. 63/033,335, filed on Jun. 2, 2020.

(51) Int. Cl.
G06Q 30/0203   (2023.01)
G06Q 30/0201   (2023.01)

(52) U.S. Cl.
CPC ..... *G06Q 30/0203* (2013.01); *G06Q 30/0201* (2013.01)

(58) Field of Classification Search
None
See application file for complete search history.

(56) References Cited

U.S. PATENT DOCUMENTS

| | | |
|---|---|---|
| 7,302,611 B2 | 11/2007 | Ganesh |
| 7,509,415 B2 | 3/2009 | Baekelmans |
| 7,869,906 B2 | 1/2011 | Louch |
| 8,121,853 B2 | 2/2012 | Cates |
| 8,640,033 B2 | 1/2014 | Jackson |

(Continued)

FOREIGN PATENT DOCUMENTS

CA    2147403 A1    12/1995

OTHER PUBLICATIONS

Verint ForeSee, Digital Experience Index (Year: 2019).*

(Continued)

*Primary Examiner* — Mohamed N El-Bathy
(74) *Attorney, Agent, or Firm* — Schwegman Lundberg & Woessner, P.A.

(57) ABSTRACT

A user experience management system obtains survey results providing insight on the user's experience with provided products and services. Periodically, the user experience management system uses these results in conjunction with the help desk data and the user experience management system monitoring data to identify the set of problems with specific products and services on a granular level. The product management system generates a resolution to address a problem definition generated by the user experience management system. The user experience management system monitors the resolution and updates the database with data pertaining to the resolution. Other embodiments are disclosed herein.

20 Claims, 14 Drawing Sheets

(56) References Cited

U.S. PATENT DOCUMENTS

| | | | |
|---|---|---|---|
| 9,479,416 B2 | 10/2016 | Black | |
| 10,282,247 B2 | 5/2019 | Ottavio | |
| 2003/0149578 A1 | 8/2003 | Wong | |
| 2006/0184357 A1* | 8/2006 | Ramsey | G06F 40/263 704/9 |
| 2006/0191007 A1 | 8/2006 | Thielamay | |
| 2008/0011569 A1* | 1/2008 | Hillier | G06Q 10/06 191/12.2 R |
| 2009/0138583 A1 | 5/2009 | Childress | |
| 2015/0046151 A1* | 2/2015 | Lane | G06F 16/358 704/9 |
| 2015/0134404 A1 | 5/2015 | Gustafson | |
| 2016/0055071 A1 | 2/2016 | Vlachogiannis | |
| 2016/0173326 A1 | 6/2016 | Koehler | |
| 2016/0378859 A1* | 12/2016 | Banik | G06F 16/358 707/708 |
| 2017/0249389 A1* | 8/2017 | Brovinsky | G06Q 30/02 |
| 2018/0012242 A1 | 1/2018 | Phan | |
| 2018/0336207 A1* | 11/2018 | Dunne | G06F 16/35 |
| 2020/0074312 A1* | 3/2020 | Liang | G06F 40/30 |
| 2020/0089761 A1* | 3/2020 | Guerra | G06F 16/90332 |
| 2020/0274782 A1* | 8/2020 | Balaiah | H04L 67/10 |
| 2020/0349199 A1 | 11/2020 | Jayaraman | |
| 2020/0364610 A1* | 11/2020 | Sweeney | G06N 20/00 |
| 2021/0150594 A1* | 5/2021 | Zhu | G06F 40/30 |
| 2022/0027431 A1* | 1/2022 | Zheng | H04L 67/51 |
| 2022/0060566 A1* | 2/2022 | Donohue | G06F 3/048 |

OTHER PUBLICATIONS

Kubiak et al., An Overview of Data-Driven Techniques for IT-Service-Management (Year: 2018).*

Monteiro et al., Continuous Improvement of Systems in Maintenance Using a Proactive Quality Management (Year: 2018).*

Doll, LDA Topic Modeling: An Explanation, https://towardsdatascience.com/lda-topic-modeling-an-explanation-e184c90aadcd, Jun. 24, 2018.

* cited by examiner

Benchmarking DXI

DXI Target Calculation:

Current DXI Score +
(Room For Improvement *
Relative Standard Deviation)

USER EXPERIENCE MANAGEMENT SYSTEM

CROSS REFERENCED TO RELATED APPLICATIONS

This claims priority to U.S. Provisional Patent Application Ser. No. 63/033,335, filed Jun. 2, 2020, the contents of which are incorporated herein by reference in their entirety.

BACKGROUND

Companies are interested in obtaining customer satisfaction data to estimate their revenue growth as well as their standing with respect to competition. Tools to gauge customer satisfaction with a company's product or service include focus groups, surveys, online surveys, etc.

One metric that is used in online surveys is the Net Promoter Score (NPS). NPS generally used to assess a company's customer loyalty by asking questions pertaining to whether the customer would recommend the company's product or service.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
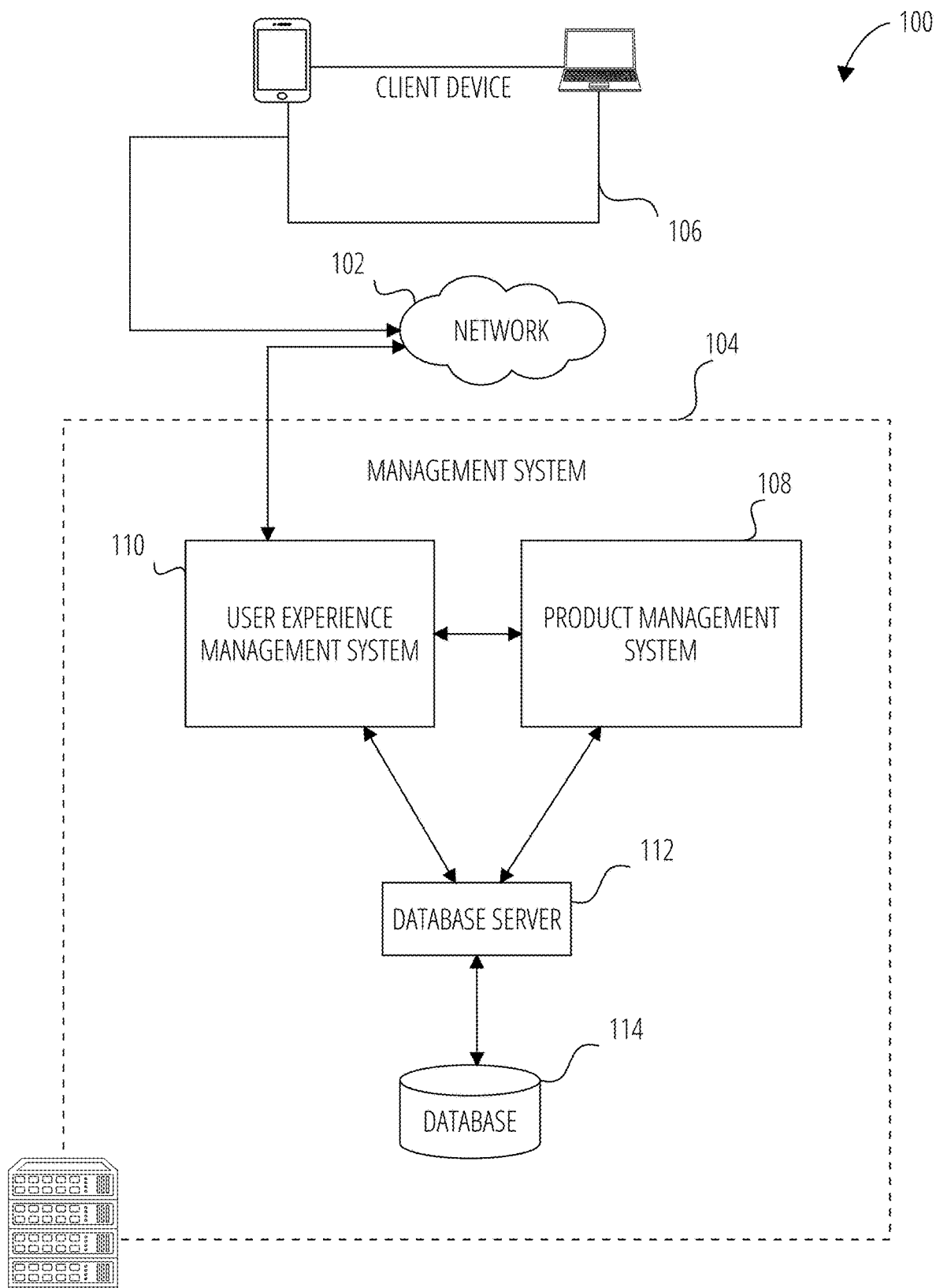
FIG. 1 is a diagrammatic representation of a networked environment in which the present disclosure may be deployed, in accordance with some examples.

Current management tools such as NPS focuses on assessing the relationship between a customer and a company using the customer's loyalty to the company. Specifically, NPS surveys are designed to grade a customer on a scale that establishes the customer as a promoter or a detractor. Accordingly, the NPS surveys ask questions regarding the likelihood of the customer making future purchases of company's products or services and the likelihood of the customer making recommendations of the company's products or services.

When assessing employee satisfaction with products or services provided internally by the company, these existing metrics may not provide the company with an accurate understanding of their employee's experience with these products and services. Examples of products or services provided to employees can include email, video conferencing tools, database tools, Virtual Private Network (VPN) services, collaboration tools, etc. These products and services allow the employee to perform his or her job tasks such that, if the employee is not satisfied with the products or services, the employee's productivity is directly caused to be negatively affected.

There is thus a need to quantify the employee's satisfaction as well as identify the products or services at issue as well as the employee's complaint specifically. Since large companies may have employees located in different geographic locations performing vastly different duties and tasks, the surveys needed to assess the employees' satisfaction with the company-provided products or services have to be scalable to capture the entire employee population. Additionally, to ensure that the employee is willing to respond to the survey, it is imperative that the surveys are easy to understand as well as easy to complete quickly.

Embodiments of the present disclosure improves on management systems by obtaining these survey results that can provide insight on the user's experience with the products and services provided to the user and using these results to identify the problems with specific products and services on a granular level. The system can also identify the problems experienced by different groups of users based on, for example, the tasks the users are performing, the geographic locations of the users, the software or hardware the users are using in conjunction with the products and services, etc.

The survey results can also be used in conjunction with data from the help desk, call records to the help desk, as well as data from system monitoring to periodically identify the problems experienced by the users. Since this data is constantly being updated, the periodic identification of the problems is also refined and continuously updated. Further, as resolutions are implemented to address the problems identified, the system can further monitor the resolution and updates the data in the database that will be accessed on the next periodic iteration to identify the problems.

Networked Computing Environment

FIG. 1 is a diagrammatic representation of a networked environment 100 in which the present disclosure may be deployed, in accordance with some examples. The networked environment 100 includes multiple instances of a client device 106, each of which hosts several applications. The client device 106 is communicatively coupled to other instances of the client device 106 and a management system 104 via a network 102 (e.g., the Internet). Each client device 106 can be associated with a user such as an employee of a company. The applications hosted on the client device 106 can include a variety of products or services provided by the company for the user perform his job tasks. Similarly, the client device 106 can also be a product that is provided by the company to the user.

The management system 104 provides communicates via the network 102 with each client device 106. While certain functions of the networked environment 100 are described herein as being performed by either the client device 106 or by the management system 104, the location of certain functionality either within the client device 106 or the management system 104 may be a design choice. For example, it may be technically preferable to initially deploy certain technology and functionality within the management system 104 but to later migrate this technology and functionality to the client device 106 that has sufficient processing capacity. The management system 104 and the client device 106 can be a machine 1300 as described in FIG. 13.

Turning now specifically to the management system 104, the management system 104 comprises a user experience management system 110 and a product management system 108 that are communicatively coupled. While not shown, the management system 104 can include an Application Program Interface (API) server that is coupled to, and provides a programmatic interface to, the user experience management system 110.

The user experience management system 110 and the product management system 108 are communicatively coupled to a database server 112, which facilitates access to a database 114 that stores data associated with data processed by the product management system 108 and the product management system 108. The database 114 can be stored in the user experience management system 110 as illustrated in FIG. 1. In one example, the database 114 can be stored on one or more computers that comprise the user experience management system 110 or are communicatively coupled with the user experience management system 110. In another example, the database 114 can be stored in one or more servers that comprise the user experience management system 110 or are communicatively coupled with the user experience management system 110.

The user experience management system 110 can identify and prioritize a subset of problems associated with the products and services provided by the company by analyzing data stored in the database 114 including the survey responses from the users, the calls and tickets receives by the company's help desk, as well as data generated by monitoring the company's systems. Using this subset, the user experience management system 110 can further generate a message including a problem definition and a prioritization to the product management system 108. The user experience management system 110 also causes each of the client device 106 to display a survey prompting the users respectively to respond to questions pertaining to their experience and satisfaction with the products and services provided by the company.

The product management system 108 can receive the message generate a diagnosis which can be a resolution, a workaround, and mark the problem as a known issue that is being processed. The product management system 108 can also further determine data available such as key performance indicators (KPIs) with which the resolution or workaround can be assessed.

The user experience management system 110 can work in conjunction with the product management system 108 to search for data pertaining to the problem in the problem definition, and to perform a root cause analysis and user experience research to inform the product management system 108's generated diagnosis. The user experience management system 110 can also work in conjunction with the product management system 108 to assess a pilot test of the resolution (or workaround) to determine whether the resolution (or workaround) is acceptable and to apply and communicate the resolution to the client device 106 in the networked environment 100 (e.g., employees in the company).

The product management system 108 can also monitor the resolution has it is deployed to the users. For example, the product management system 108 can generate data associated with the resolution by monitoring the company's system (e.g., system monitoring) which is stored in the database 114. On a subsequent cycle, the product management system 108 will obtain this data associated with the resolution from the database 114 to identify the subset of problems.

System Architecture of the User Experience Management System

Figure 2:
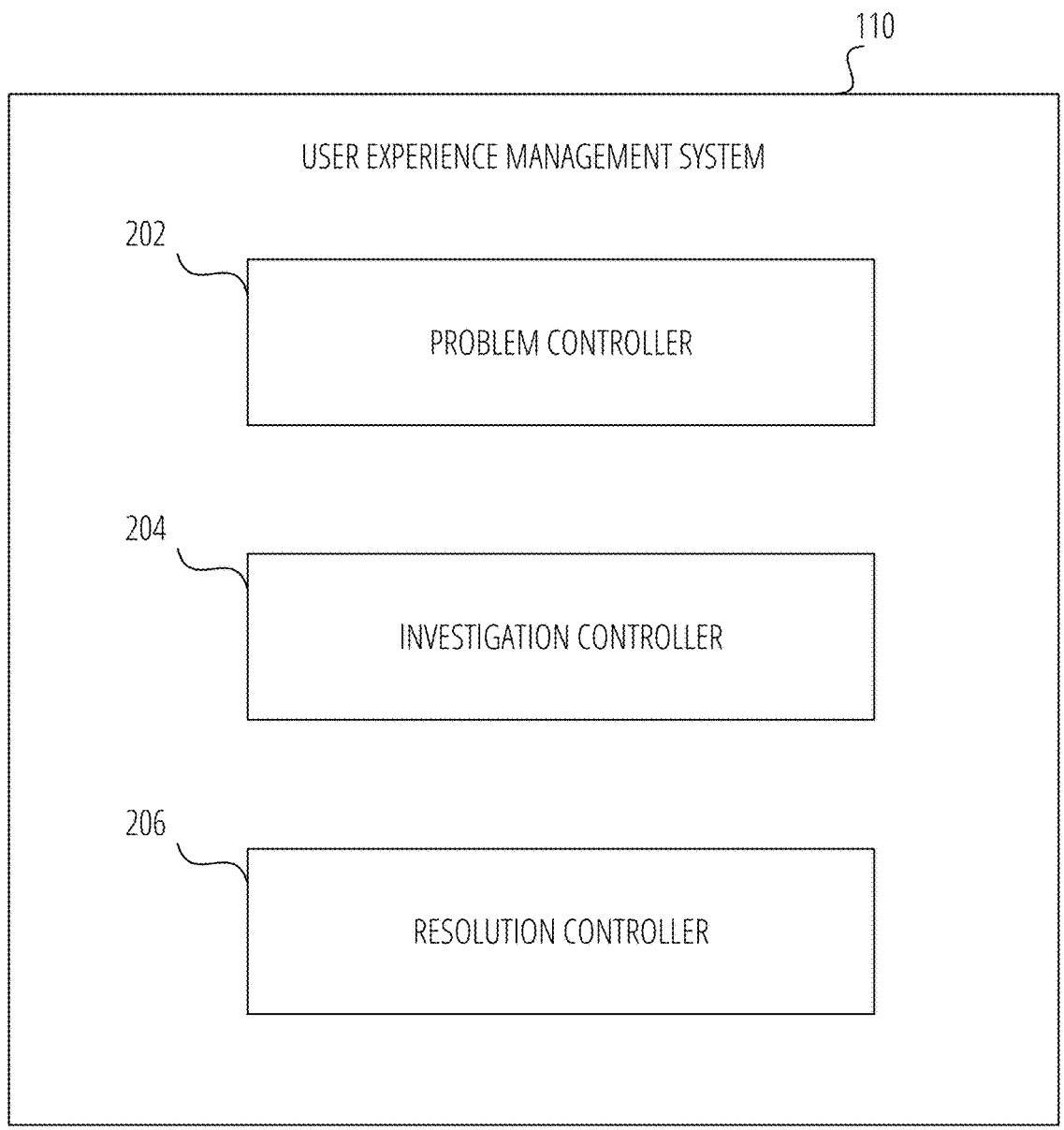
FIG. 2 is a diagrammatic representation of the details of the user experience management system, in accordance with some examples.

FIG. 2 is a diagrammatic representation of the details of the user experience management system 110, in accordance with some examples. The networked environment 100 is shown to comprise a problem controller 202, an investigation controller 204, and a resolution controller 206. The problem controller 202, the investigation controller 204, and the resolution controller 206 can be communicatively coupled with each other as well as with the product management system 108, and the database 114 via the database server 112.

Data Architecture

Figure 3:
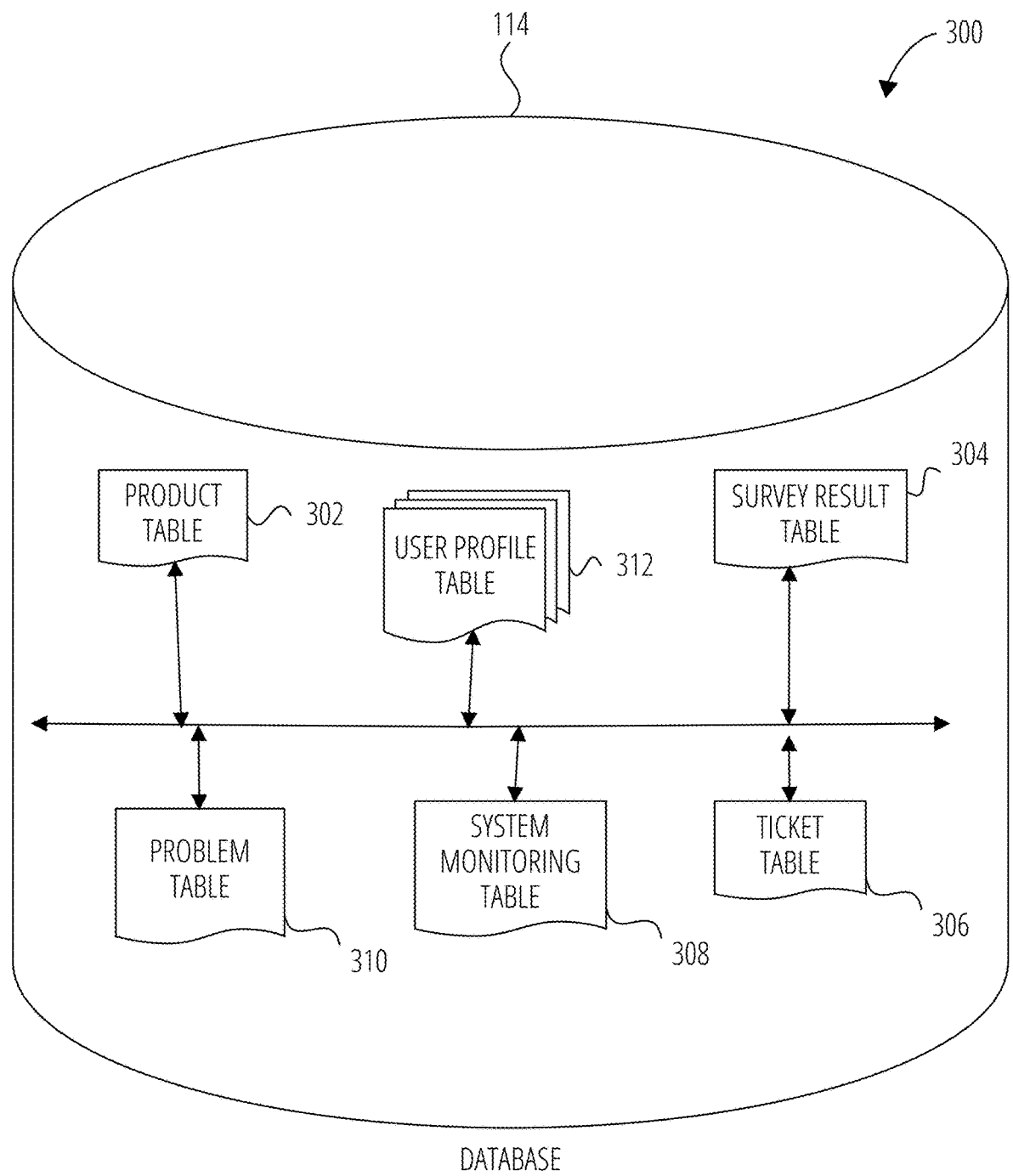
FIG. 3 is a diagrammatic representation of a data structure as maintained in a database, in accordance with some examples.

FIG. 3 is a diagrammatic representation of a data structure as maintained in a database 114, in accordance with some examples. While the content of the database 114 is shown to comprise several tables, it will be appreciated that the data could be stored in other types of data structures (e.g., as an object-oriented database).

The database 114 includes a product table 302 that stores data about the products and services that are being used by the company and can be provided to the users to perform their job tasks. For example, the data about the products and services can include the name, the version number, the date of installation, several tickets or calls to help desk related to the products or services, etc.

The data stored in the user profile table 312 includes information pertaining to the users in the networked environment 100. For example, the information can include the user's position in the company, the geographical location of the user, the products or services that are provided to the user, survey responses associated with the user, etc.

The survey result table 304 stores the survey results received from the users via each client device 106. When a user completes a survey that is being displayed on his client device 106, his selections or responses are received by the user experience management system 110 and stored in the survey result table 304. The survey result table 304 can also store complementary data such as data from general customer satisfaction surveys, data obtained from focus groups, and post-task surveys (e.g., data from surveys completed by users subsequent to completing a task and related to the task).

The ticket table 306 stores information related to each of the tickets or calls to the company's help desk or a third-party help desk. When a user is having an issue with a product or service that was provided by the company (e.g., his work email portal), the user can contact the company's help desk (or Information Technology (IT) group) to report the issue and request help resolving the issue. A ticket that includes the information associated with the user and this issue opened and the help desk will review the ticket. Similarly, when a call is received by the help desk, information on the call may also be recorded in a ticket or as a separate call record. Both the information recorded in a ticket and the call record can be stored in the ticket table 306.

As the user experience management system 110 monitors the company's system (e.g., the networked environment 100), the information generated from this monitoring is stored in the system monitoring table 308. One example of information generated from this monitoring includes application activity (e.g., activity time using the product and services), metrics on performance of the application (e.g., product or service), data gathered from the user's usage of the product and services, etc.

The database 114 can also include problem table 310 that stores the problems that are identified by the user experience management system 110 (e.g., the set of problems, the subset of problems, in FIG. 10 and FIG. 12) and data related to the problems including the information on the users reporting the problems (e.g., geographic location, job type, job tasks, etc.), the prioritization associated with the problems, the products or services associated with the problems, etc.

Process for Obtaining Survey Results

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
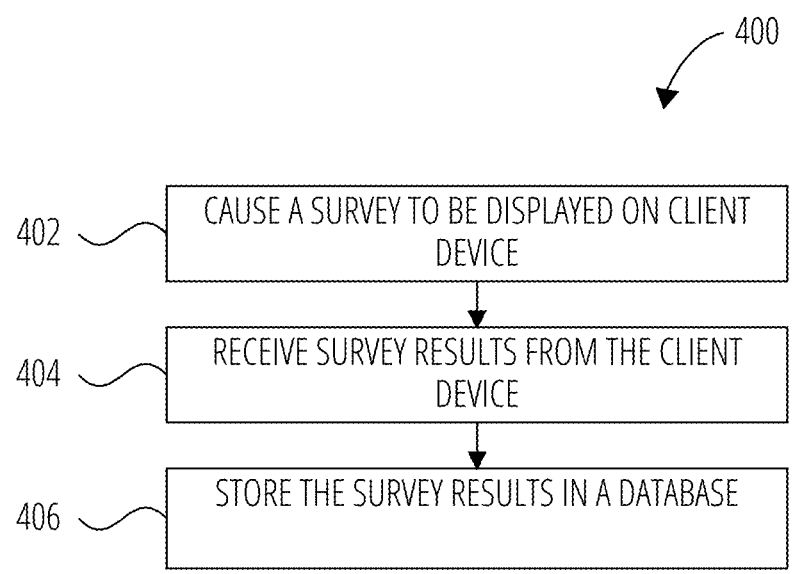
FIG. 4 is a flowchart for a process 400 for obtaining survey results, in accordance with some examples.
Figure 6:
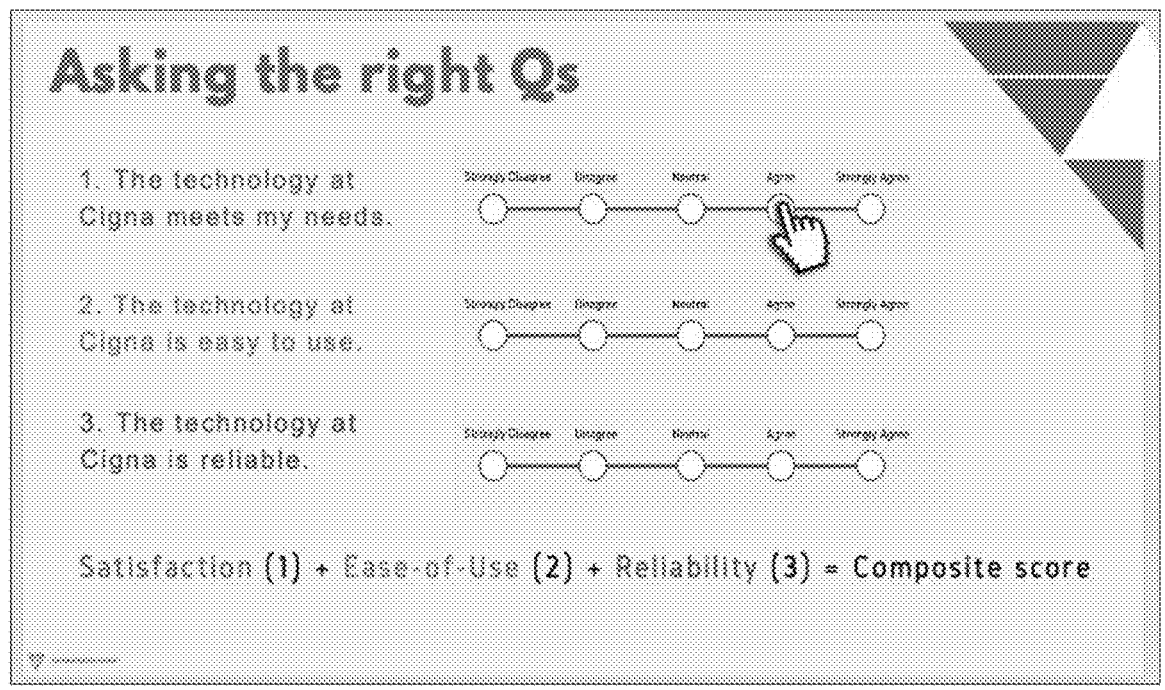
FIG. 6 illustrates a survey interface display 600 in accordance with one embodiment.
Figure 7:
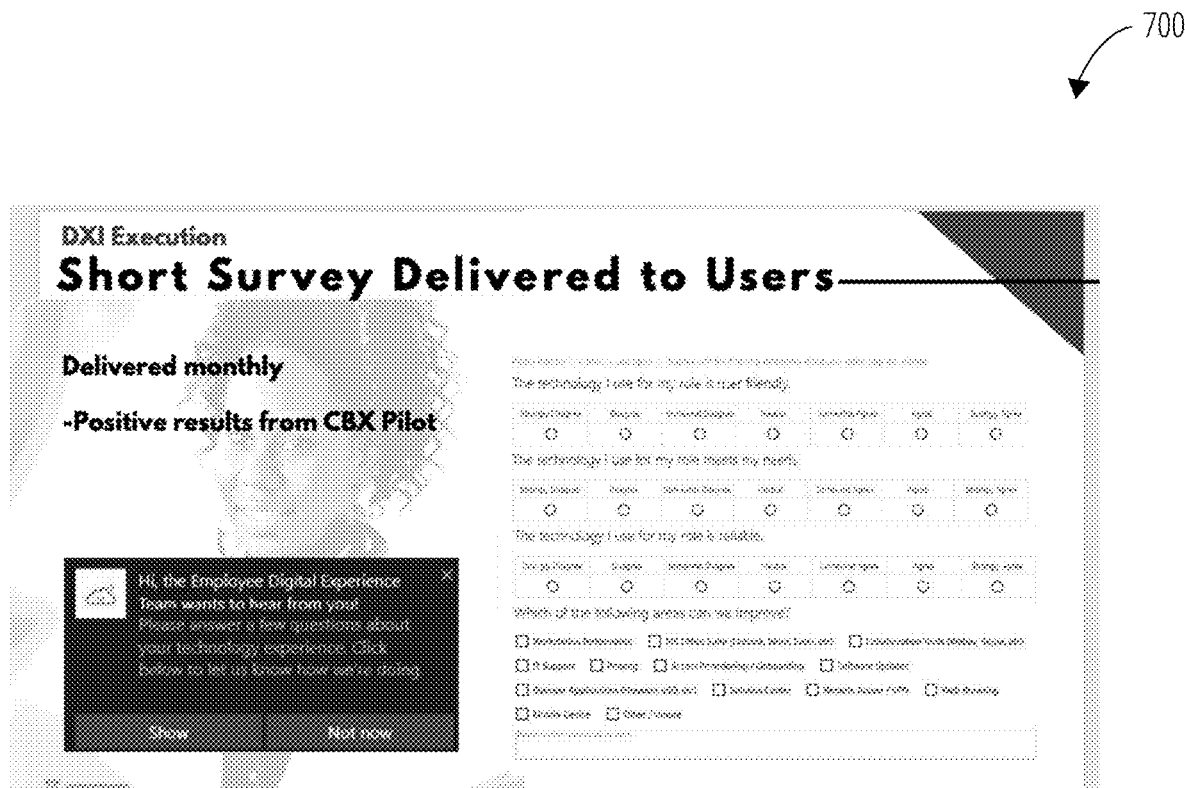
FIG. 7 illustrates a survey interface display 700 in accordance with one embodiment.

FIG. 4 is a flowchart for a process 400 for obtaining survey results, in accordance with some examples. In one embodiment, the user experience management system 110 starts at operation 402 by causing a survey to be displayed by a display of the client device 106. The survey can be displayed in a pop-up window. Examples of the survey being displayed are illustrated in FIG. 6 and FIG. 7. The user can select the responses to each of the questions illustrated in survey interface display 600 of FIG. 6 or survey interface display 700 in FIG. 7. The survey can be caused to be displayed by all or a portion of the client devices 106 in the networked environment 100. The portion of the client devices 106 can be selected to be representative of the whole population of users in the networked environment 100. For example, if a whole population of users comprises 50% users in California and 50% users in New York, the portion of client devices 106 selected can comprise of 50% client devices 106 associated with users in California and 50% client devices 106 associated with users in New York. The portion of the client devices 106 selected can also be targeted. For example, the client devices 106 associated with users that have previously provided responses indicating that they are very unhappy with the products and services may targeted such that their concerns may be addressed.

At operation 404, the user experience management system 110 receives the survey results from the client device 106. The survey results are the user's selected responses. At operation 406, the user experience management system 110 stores the survey results in the survey result table 304 of the database 114.

In one embodiment, prior to displaying the survey, a pop-up window is caused to be displayed for a predetermined period of time and includes a text query to the user asking to if the user wishes to respond to a survey. In this embodiment, when the user selects a selectable element in the pop-up window indicating his willingness to participate, the survey is caused to be displayed. When the user selects a selectable element that indicates he is not willing to particulate, the pop-up window disappears and the survey is not displayed. When the predetermined period of time expires and the user has made no selection of any selectable elements in the pop-up window, the pop-up window disappears and the survey is not displayed.

Model of the Survey Results

Figure 5:
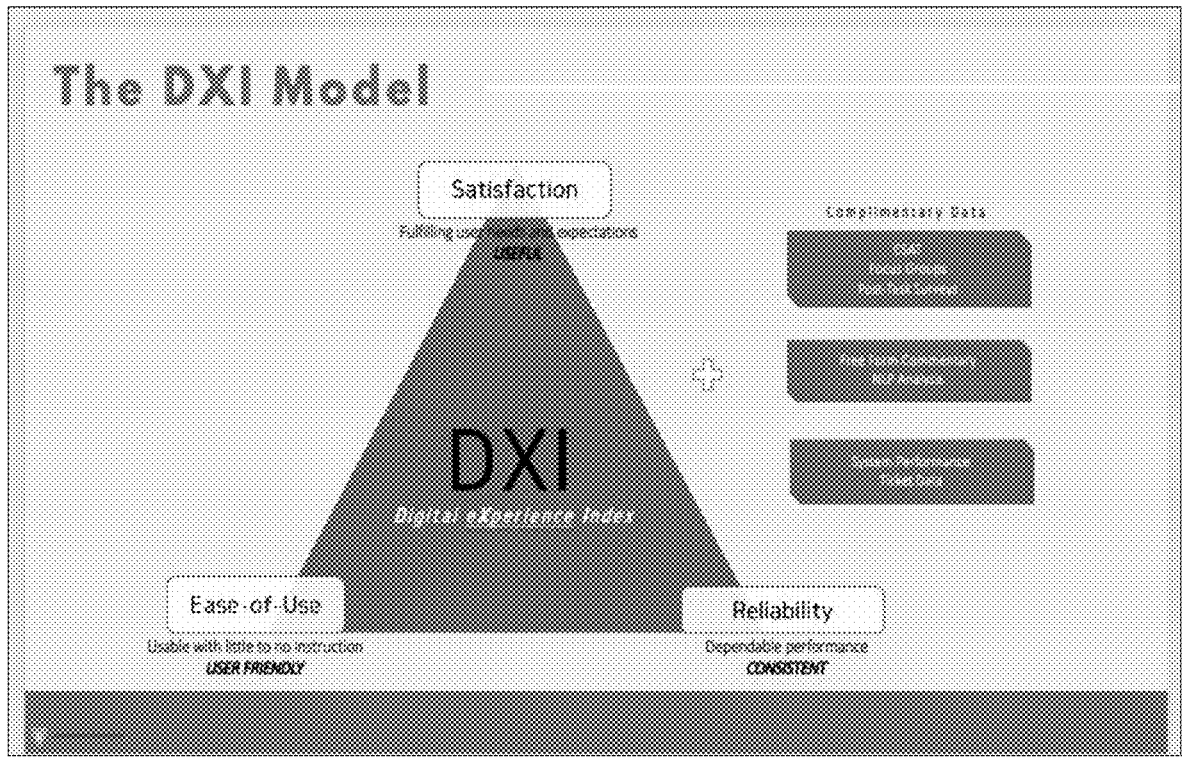
FIG. 5 is a diagram 500 of a model of the survey results, in accordance with one embodiment.

FIG. 5 is a diagram 500 of a model of the survey results, in accordance with one embodiment. In one embodiment, the user experience management system 110 generates a survey to assess the user's experience with the products and services provided by the company. As shown in FIG. 5, the survey aims to quantify the user's satisfaction with respect to the products and services (e.g., whether the user's needs and expectations being fulfilled or whether the products are services are useful), the ease-of-use of the products and services (e.g., whether the products and services usable with little or no instruction or whether the products and services are user-friendly), and the user's perceived reliability of the products and services (e.g., whether the products and services are dependable or consistent).

In some embodiments, the user experience management system 110 generates a survey that requests additional data that asks the user to provide further commentary. For example, as shown in survey interface display 700, the question "which of the following areas can we improve?" and options are presented to the user for selection. The user can select via the user interface one or more of the selectable items associated with the options. As shown in survey interface display 700, options can include, for instance, Workstation Performance, Collaboration Tools, Information Technology (IT) Support, Printing, Access Provisioning or On-boarding, Software Updates, Business Applications, Solution Center, Remote Access/Virtual Private Network (VPN), Web Browsing, Mobile Device, etc. The user can also enter text via a text input box in the survey interface display 700 to provide further comments. Based on the user's selections identifying the areas for improvement, the categorical views of the results based on specific products can be generated as further discussed below.

Examples of Survey Interface Displays

FIG. 6 illustrates a survey interface display 600 in accordance with one embodiment. The survey interface display 600 can be an example of the survey that is caused to be displayed by each client device 106. The survey interface display 600 includes three questions and each of the questions aims to quantify a different metric from FIG. 5: Satisfaction, Ease-of-Use, and Reliability.

For each question, the user is able to provide a response. In the survey interface display 600, the user can select one of the options (e.g., strongly agree, agree, neutral, disagree, and strongly disagree) as a response per question.

Each of the options can be associated with a value score. In one example, the options can be associated respectively with scores ranging from 0 to 4 (e.g., Strongly agree can be associated with 4 while strongly disagree is associated with 0). In one embodiment, the Likert scale is used. A composite score can also be generated by adding the responses obtained for each question or by averaging the responses obtained for each question. In another embodiment, weights can be allocated to each of the questions such that the responses related to satisfaction, ease-of-use, and reliability are not given equal importance in the composite score. The weights can be allocated based on the user's job, geographic location, tasks, or based on the needs of the company, the product or services assessed, or other various criteria.

In the embodiments, where the survey further includes a question asking the user to provide further commentary (e.g., "which of the following areas can we improve?") and the user can be provided with a list of products to select and an open text field. The user's commentary can also be a string of characters ("Videoconferencing system is the best") that the user enters free-form. The user experience management system 110 can identify keywords ("Videoconferencing") with the value scores or composite score provided.

FIG. 7 illustrates a survey interface display 700 in accordance with one embodiment. The survey interface display 700 can be another example of the survey that is caused to be displayed by each client device 106. The survey interface display 700 includes three questions and each of the questions aims to quantify a different metric from FIG. 5: Satisfaction, Ease-of-Use, and Reliability.

For each question, the user is able to provide a response. In the survey interface display 700, the user can select one of the options (e.g., strongly agree, agree, somewhat agree, neutral, somewhat disagree, disagree, and strongly disagree) as a response per question.

Each of the options can be associated with a value score. In one example, the options can be associated respectively with scores ranging from 0 to 6 (e.g., Strongly agree can be associated with 6 while strongly disagree is associated with 0). In one embodiment, the Likert scale is used. A composite score can also be generated by adding the responses obtained for each question or by averaging the responses obtained for each question. In another embodiment, weights can be allocated to each of the questions such that the responses related to satisfaction, ease-of-use, and reliability are not given equal importance in the composite score. The weights can be allocated based on the user's job, geographic location, tasks, or based on the needs of the company, the product or services assessed, or other various criteria.

In the embodiments, where the survey further includes a question asking the user to provide further commentary (e.g., "which of the following areas can we improve?") and the user can be provided with a list of products to select and an open text field. The user's commentary can also be a string of characters ("Videoconferencing system is the best") that the user enters free-form. The user experience management system 110 can identify keywords ("Videoconferencing") with the value scores or composite score provided.

Examples of Results Calculation

Figure 8:
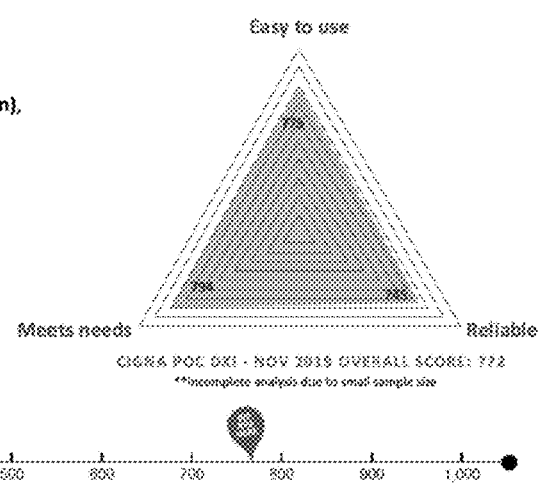
FIG. 8 illustrates a diagram 800 of results calculations, in accordance with one embodiment.

FIG. 8 illustrates a diagram 800 of results calculations, in accordance with one embodiment. For each question in FIG. 6 or FIG. 7, a result can be generated that is on a scale (e.g., between 0-1000). This result is obtained by taking the average of all value scores (e.g., 0 through n) multiplied by (1000/n), where n is the total number of response options minus one. In FIG. 6, there are 5 possible response options (e.g., strongly agree, agree, neutral, disagree, and strongly disagree) such that n is equal to 4 (e.g., 5-1). Further, in FIG. 6, the 5 possible response options provides for a 4 point scale (e.g., 0 to 4).

For example, in response to the ease-of-use question, if the user selected "strongly agree", the result can be obtained by multiplying the value score of 4 associated with "strongly agree" by 250 (e.g., 1000/n, where n is 4=1000/4). to obtain 1000 as the user's survey result for ease-of-use. The composite score is an average of the value scores associated with each of the responses to the three questions. For example, if the user selected "strongly agree" to the ease-of use question (e.g., value of 4), "agree" to the reliability question (e.g., value of 3), and "neutral" to the satisfaction question (e.g., value of 2), the composite score is 3 (e.g., (4+3+2)/3). To obtain the result associated with this composite score of 750, the composite score of 3 is multiplied by 250 (e.g., 1000/n, where n is 4=1000/4).

As discussed in FIG. 8, other examples of surveys can provide for a different number of response choices. For example, when there are 7 possible response options (e.g., strongly agree, agree, somewhat agree, neutral, somewhat disagree, disagree, and strongly disagree) like in in FIG. 7, a 6 point scale is used (e.g., 0 to 6) and n is equal to 6 (e.g., 7–1) such that the multiplier used is 166.67 (e.g., 1000/6). In other examples, 3 response choices provides a 2 point scale (0-2) and uses a multiplier of 500 (1000/2), and 11 response choices provides (0-10) and uses a multiplier of 100.

The results that are based on the responses to the survey that is tailored to satisfaction, ease-of-use, and reliability provides insight into the user's feelings and perception of their experience with the products and services that are provided to them by the company. Using these results obtained by the user experience management system 110 and stored in the database 114, the user experience management system 110 can identify actions that the user is taking (e.g., emailing, logging into a VPN, videoconferencing, word processing, spreadsheet generating, collaborating with other users, etc.) and select the problems that need to be addressed to improve the user's experience with the products and services that will make them more productive. The results can be obtained from all of the users in the company (e.g., the networked environment 100) or a subset thereof such that the results can be added to a general data pool from which trends regarding the user's experience with the products and services can be derived. For example, the results can provide trends based on persona type, applications used, geographic locations, hardware or software model used on the client device 106, etc. Different persona types (e.g., sales department, engineering department, legal department) can also be associated with different experience targets based on the results obtained. In some embodiments, a neural network can be used to receive the information from database 114 and generate outputs regarding the trends and the user's experience. In this embodiment, the neural network can be convolutional neural network (CNN), a Long Short Term Memory networks (LSTM), a recurrent neural network (RNN), etc.

The user experience management system 110 can inform the product management system 108 of the problems and provide data and user experience support to the product management system 108 in generating a diagnostic to the problem. The user experience management system 110 can further monitor implementation of the resolution provided in the diagnostic to inform and modify its decisions.

Figure 9:
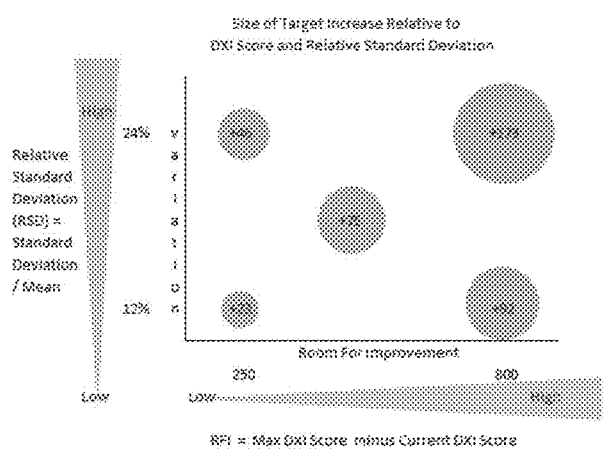
FIG. 9 illustrates a diagram 900 of benchmark (or target) calculations, in accordance with one embodiment.

FIG. 9 illustrates a diagram 900 of benchmark (or target) calculations, in accordance with one embodiment. As shown in FIG. 9, the target score can be calculated by adding the result obtained in FIG. 8 (e.g., current score) with the product of a room for improvement (RFI) score and the Relative Standard Deviation (RSD) (or the coefficient of variation). The RFI score is obtained by subtracting the result obtained (e.g., current score) from the maximum possible result (e.g., a perfect score). Further, the RSD is the Standard Deviation divided by the Mean. As shown in diagrams 900 which illustrates the RFI score on an x-axis and the RSD on a y-axis, the size of the target score increases relative to the result obtained (e.g., current score) and the RSD.

Details of Management System

Figure 10:
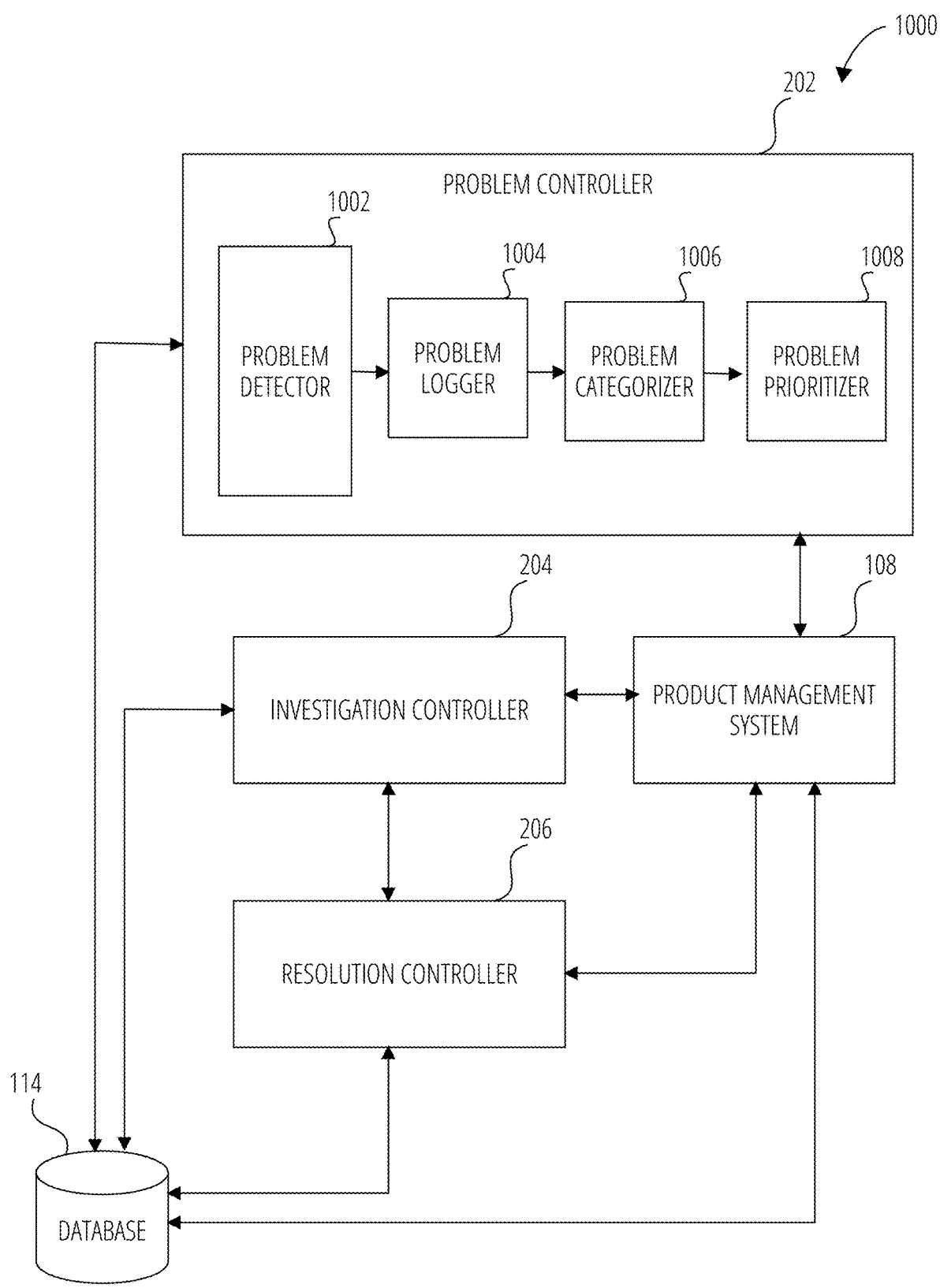
FIG. 10 illustrates an item 1000 of the details of management system 104 in accordance with one embodiment.

FIG. 10 illustrates an item 1000 of the details of management system 104 in accordance with one embodiment. The management system 104 uses the data pool of information stored in the database 114 including the results of the survey to identify and resolve the problems with the products and services experienced by the users in the networked environment 100.

As shown in FIG. 10, the problem controller 202, the investigation controller 204 and the resolution controller 206 of the user experience management system 110 are communicatively coupled with each other and with the product management system 108. The product management system 108 and each of the controllers in user experience management system 110 may also access the database 114 to retrieve, store, or update data stored therein.

In this embodiment, the problem controller 202 comprises a problem detector 1002, a problem logger 1004, a problem categorizer 1006, and a problem prioritizer 1008. The problem detector 1002 can receive the data from the database 114 including, for example, the data from the survey result table 304 (e.g., results from the surveys, results from customer satisfaction surveys, focus group results, etc.), data from the ticket table 306 (e.g., data on tickets or calls to the help desks), and data from the system monitoring table 308 (e.g., data generated from monitoring the networked environment 100, productivity measures). The problem detector 1002 is thus utilizing data associated with multiple users of the networked environment 100 (e.g., user data from user profile table 312 and user's responses in the survey result table 304) as well as from system detected channels (e.g., ticket table 306, system monitoring table 308). In one embodiment, the problem detector 1002 obtains and receives this data from the database 114 on a predetermined frequency (e.g., monthly, bi-monthly, weekly, etc.).

In one embodiment, the problem detector 1002 processes the data from the database 114 and applies criteria to the data to identify a set of problems (e.g., top 5 problems that need to be resolved). For example, based on the combination of data received, the criteria can include 1) determining whether the product or service associated with the data is known, 2) determining whether the product or service is provided by the company, and 3) determining whether the users can be identified. The problem detector 1002 can generate the set of problems from the data received from the database 114 on another predetermined frequency (e.g., quarterly basis).

In one embodiment, the problem detector 1002 can comprise a neural network to receive the data from the database 114 as input and is configured to output a set of problems based on the criteria. In this embodiment, the problem detector 1002 can use the responses to the survey (e.g., survey interface display 600) that investigates the user's perception of satisfaction, ease-of-use, and reliability with regard to the products and services provided as an early indicator of the content of the tickets and calls that the help desk is receiving or will receive. By comparing the trends observed between the responses to the surveys and the contents of the tickets and calls as well as the data from system monitoring, models that identify issues or problems based on these trends can be generated and used to build the neural network implemented in the problem detector 1002. The neural network implemented in the problem detector 1002 can thus receive the data from the survey result table 304, the ticket table 306 and the system monitoring table 308 and output the set of problems based on the criteria. Further details on the problem detector 1002 is discussed in relation to FIG. 11A and FIG. 11B.

The problem logger 1004 receives the set of problems and processes the set of problems through a priority matrix to select a subset of the problems from the set of problems (e.g., top 3 problems that need to be resolved). The priority matrix can include four quadrants such as quick wins, strategic, long term, and major projects. Whether the problems are assessed based on the user value (e.g., 0 to 10 points) and complexity of the solution or engineering required (e.g., 0 to 10 points). For example, a problem such as the VPN being too slow can be quickly resolved (e.g., complexity: 2 points) and greatly increase the user's satisfaction with the VPN service (e.g., user value: 9 points) such that this problem will fall in the "quick wins" quadrant. In contrast, a problem with the company's access provisioning (e.g., on-boarding program) may require much more effort to resolve (e.g., complexity: 7 points) such that the problem may fall into the "long-term" quadrant. The priority matrix can be dynamically updated based on the company's needs. The problem logger 1004 then generates a record of the subset (e.g., top 3 problems) and stores the record in the database 114 in the problem table 310.

The problem categorizer 1006 uses the subset to identify a problem definition and the problem prioritizer 1008 uses the subset to identify a prioritization (e.g., level of priority to associated to the problem definition). The problem prioritizer 1008 can generate a message that comprises the problem definition and the prioritization that is transmitted to the product management system 108 for further investigation.

The product management system 108 receives the message and intakes the problem definition as defined by the user experience management system 110. The product management system 108, the investigation controller 204, or a combination thereof, can determine whether data associated with the problem definition is available. If so, the available data associated with the problem definition is obtained by the product management system 108 or the investigation controller 204. The product management system 108, the investigation controller 204, or a combination thereof, can perform root cause analysis and user experience research to inform the diagnosis to the problem definition.

The product management system 108 generates the diagnosis which can be a resolution or a workaround to the problem definition. The diagnosis can also be an indication that the problem definition is a known issue that is currently being resolved or already resolved. The product management system 108 can store the diagnosis in the problem table 310 of the database 114. The product management system 108 can determine whether further data is available such as key performance indicators (KPIs) with which the resolution or workaround can be assessed. If this performance data is available, the product management system 108 can obtain this performance data and provide the performance data to the resolution controller 206.

The product management system 108, the resolution controller 206, or any combination thereof, can use the performance data (e.g., KPI) to implement a pilot test of a resolution designed by the product management system 108. If the pilot test shows the resolution works as designed or is the correct design than the resolution is marked for implementation. Otherwise, the product management system 108, the investigation controller 204, or any combination thereof, performs further root cause analysis and user experience research to update the diagnostic.

When the resolution is marked for implementation, the product management system 108, the resolution controller 206, or any combination thereof, apply the resolution and communicates the resolution to each client device 106 in the networked environment 100. For example, if the resolution is an update to the videoconference application to unlock upgraded features, the resolution controller 206 and/or the product management system 108 can communicate this update to the users in the networked environment 100 and cause the update to be accessible to on each of the client devices 106.

The resolution controller 206 then monitors the resolution as it is implemented across the networked environment 100. The resolution controller 206 can store the data associated with the resolution obtained from system monitoring in the system monitoring table 308 (e.g., tickets or calls related to the resolution). The resolution controller 206 can also store problems associated with the resolution in the problem table 310. By updating the database 114 accordingly, the problem detector 1002 will process this data the next time it receives the data from the database 114 (e.g., monthly, weekly, etc.).

Problem Detector Processing of Free-Form Comments

The problem detector 1002 can further process the free-form comments (e.g., user's commentary) that are inputted in the survey interface display 600 and survey interface display 700 and received from the survey result table 304. The problem detector 1002 can process the free-form comments through a method of machine learning such as topic modeling which is the process of creation of a statistical model to extract topics based on a collection of documents (e.g., a collection of surveys with user commentaries). The Latent Dirichlet Allocation (LDA) is one example of a topic modeling algorithm that can be used by the problem detector 1002. In this example, the set of problems that are output by the problem detector 1002 can be based on the topics that are extracted using the topic modeling algorithm.

In order to extract the topics, the problem detector 1002 can perform pre-processing of the free-form comments. The pre-processing can include, for example, setting the text in the free-form comments to lowercase characters and tokenizing the text into individual words; removing stop words (e.g., stop words that are defined in libraries such as nltk library) from the words to be analyzed; or removing the numbers from the text while keeping the words that include numbers; removing words that only have one character. The problem detector 1002 can further pre-process the remaining words by lemmatizing the remaining words or searching for bigrams (e.g., two-word phrases) to be added to the text corpus to be analyzed. Lemmatizing the remaining words can include grouping together different inflected forms of a word in order to analyze the grouping as a single item.

The problem detector 1002 can implement the statistical model such as the Latent Dirichlet Allocation (LDA) model. The problem detector 1002 can provide inputs to the LDA model. The LDA model can receive as inputs, for example, a representation of text that corresponds the frequency of words to the word itself (e.g., a bag of words representation of text), the mapping of words to the words' identification in a genism dictionary class (e.g., Id2word), and a number of documents to be used in each training chunk (e.g., chunksize). In one example, the chunksize can be set to 4000. Another example of inputs received by the LTA model is a 1D array equal to the number of expected topics that expresses an a priori belief of each topic's probability (e.g., alpha); and an a priori belie on world probability (e.g., Eta). Alpha and Eta can both be set to automatic.

Other examples of inputs received by the LTA model can include the maximum number of iterations through the text corpus when inferring the topic distribution of a corpus (e.g., iterations, can be set to 400 for example), the number of requested topics to be extracted from the training corpus (e.g., num_topics, can be set to 10 for example), number of passes through the corpus during training (e.g., passes, can be set to 20 for example), and training evaluation frequency (e.g., eval_every, where the log perplexity is estimated that there are many updates. The eval_every input can be set to none. Every time this method is called, the training can also be set to slow down by a factor of 2.)

Figure 11A:
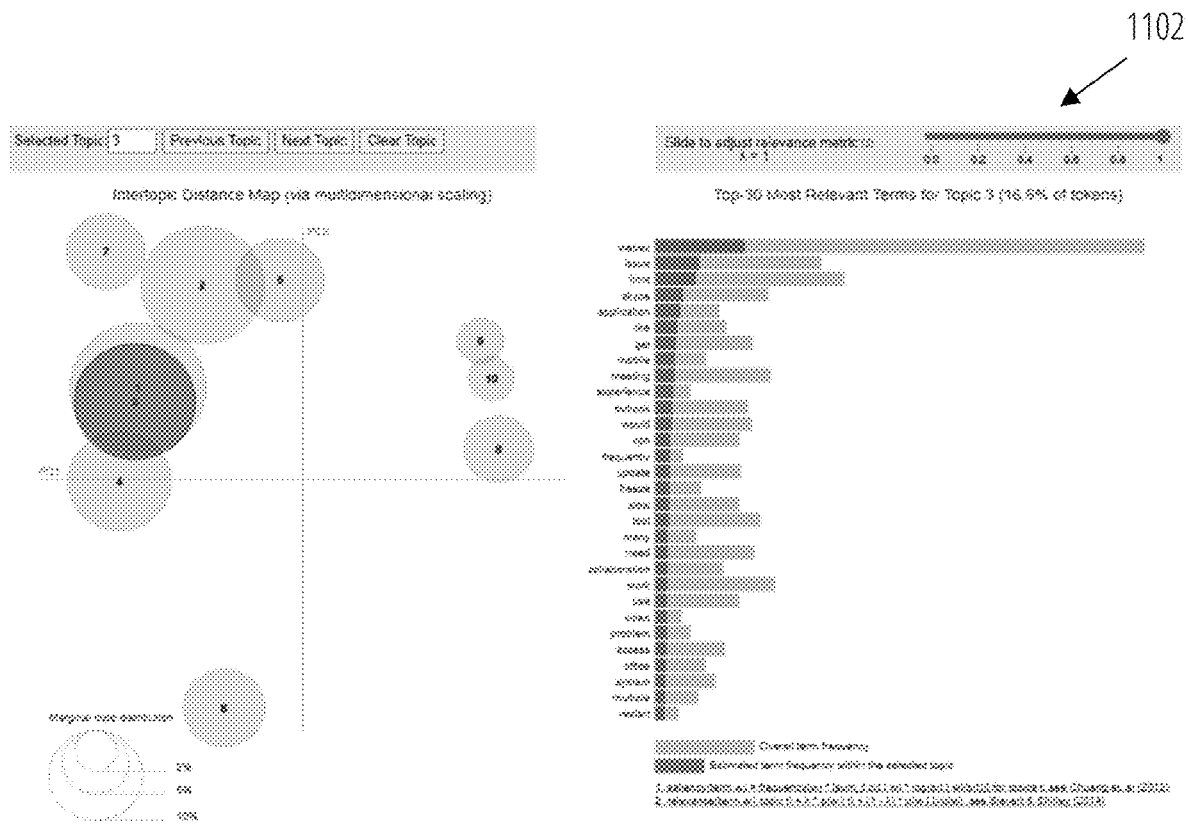
FIG. 11A illustrates an example output 1102 generated by the problem detector 1002 in accordance with one embodiment.

FIG. 11A illustrates an example of an output 1102 generated by the problem detector 1002 in accordance with one embodiment. In output 1102, each circle can represent the topics that are extracted using the topic modeling algorithm and each topic is represented by the most salient words in that topic (e.g., 30 words). The larger the topic bubble, the larger the amount of tokens that are related to that topic. For example, topic 3 in output 1102 is representative of 16.6% of the topics. The closer the topic bubbles are together, the more closely related the words that compose the topic are together. The horizontal bars represent the frequency of the word in the overall corpus of words while the shaded portion of the horizontal bars estimates the number of times a given term was generated by a topic. The longest shaded bar represents the most frequently used word in relation to a topic.

Figure 11B:
FIG. 11B illustrates an example output 1104 generated by the problem detector 1002 in accordance with one embodiment.

FIG. 11B illustrates output 1104 generated by the problem detector 1002 in accordance with one embodiment. The output 1104 includes word clouds of the top keywords in each topic. The size of the font of the word can vary based on the frequency of the keyword.

Other examples of outputs generated by the problem detector 1002 can include the dominant topic for each sentence with correspondence of the weight of the topic and keywords; the most representative freeform feedback for each topic; a distribution of document word count histogram; and a distribution of document word count by dominant topic histograms. In another example, the problem detector 1002 can generate an internal dashboard that automates machine learning analysis of data and input of data from new surveys. Using these example outputs, the problem detector 1002 can further generate the set of problems that are output.

Problem Detector Processing Survey Results and Scores Based on Personas

In one example, the problem detector 1002 can leverage personas to further inform the problem detector 1002's processing of the survey results and scores. While not shown, the user experience management system 110 can further comprise a persona system that generates and manages a plurality of personas used by the problem detector 1002. The personas can be stored in the database 114.

Each of the employees of a company that are performing jobs or tasks using the different products or services provided (e.g., email, video conferencing tools, database tools, etc.) can be associated with one or more of the personas. In one example, the persona system can generate personas that are based on the task or job to be done by the employee as well as the products or services that the employee uses.

For each employee, the persona system receives as inputs a description of the employee's core functional jobs, unique technology experiences, the employee's motivations, and goals, and analyzes the employee's problem with the product and services and determines unmet needs. The persona system can further synthesize the inputs and generate as outputs the themes and patterns that surface across the different employees.

Using factor analysis, cluster analysis or a combination thereof, the persona system can identify unique attributes for persona segmentation. The persona system can further associate the personas with the corresponding scores (e.g., FIG. 8) obtained from the surveys (FIG. 6 and FIG. 7).

In one embodiment, the problem detector 1002 processes the data from the database 114 including, for example, the responses to the surveys and the scores with respect to a persona, to identify the set of problems (e.g., top 5 problems that need to be resolved). For example, if all the employees associated with a given persona (e.g., customer service) have indicated that they need a video conferencing program to perform their job functions and the average score reported by the employees associated with that given persona indicates a major dissatisfaction with the program, the problem detector 1002 can identify this problem in the set of problems and the problem prioritizer 1008 can further indicate that the problem is of a high priority level.

Process for Dynamically Resolving Problems Using Survey Results

Figure 12:
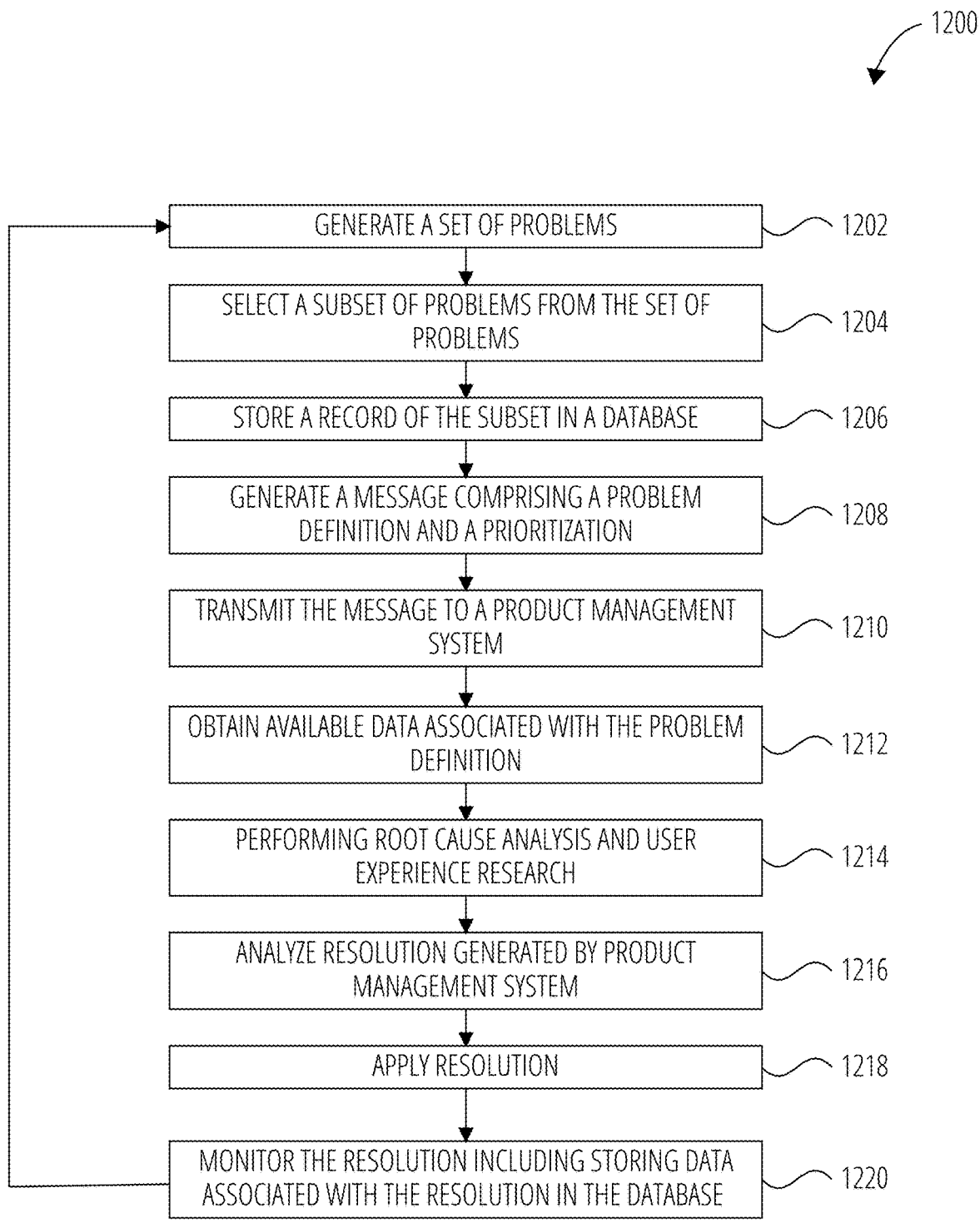
FIG. 12 illustrates a process 1200 for dynamically resolving problems using the survey results in accordance with one embodiment.

FIG. 12 illustrates a process 1200 for dynamically resolving problems using the survey results in accordance with one embodiment. The process 1200 can be performed by the user experience management system 110 or a processor included therein. The process 1200 or some of the operations thereof can also be performed by the user experience management system 110 in conjunction with the product management system 108, or processors included therein.

The process 1200 starts with the user experience management system 110 generating a set of problems based on an analysis of data on user's experience with product or services as well as data from system monitoring. The data on user's experience can be the results of a survey received from the client device 106. The data from system monitoring can include tickets or call records to a help desk. The set of problems generated by the user experience management system 110 can include the top N problems, where N>2. To generate the set of problems, the user experience management system 110 can apply criteria to the processing of the data received.

At operation 1204, the user experience management system 110 selects a subset of problems from the set of problems. The subset of problems can include the top M problems, where M<N. The user experience management system 110 can select the subset of problems using a priority matrix.

At operation 1206, the user experience management system 110 stores a record of the subset in a database 114. At operation 1208, the user experience management system 110 generates a message comprising a problem definition and a prioritization associated with the problem definition. The problem definition and the prioritization are generated based on the subset, the data from the database 114, the priority matrix or any combination thereof.

At operation 1210, the user experience management system 110 transmits the message to the product management system 108 which intakes the problem definition in the message and applies the level of priority to the problem definition based on the prioritization in the message.

At operation 1212, the user experience management system 110 obtains available data associated with the problem definition from the database 114. At operation 1214, the user experience management system 110 performs root cause analysis and user experience research. The user experience management system 110 can use the problem definition to perform the root cause analysis and user experience research. The results of the root cause analysis and user experience research as well as the available data associated with the problem definition can be transmitted to the product management system 108 to inform the product management system 108's diagnostic for the problem definition. The product management system 108 can generate a diagnostic that is a resolution for the problem definition.

At operation 1216, the user experience management system 110 analyzes the resolution generated by the product management system 108 and applies the resolution in operation 1218. In some embodiments, the user experience management system 110 also communicates the resolution to the client devices 106.

At operation 1220, the user experience management system 110 monitors the resolution which includes storing data associated with the resolution in the database 114. For example, the user experience management system 110 can store the data associated with the resolution obtained from system monitoring in the system monitoring table 308 (e.g., tickets or calls related to the resolution). The user experience management system 110 can also store problems associated with the resolution in the problem table 310.

Once operation 1220 is completed, the process 1200 returns to operation 1202. Accordingly. By updating the database 114, the user experience management system 110 will process this data the next time it receives the data from the database 114 (e.g., monthly, weekly, etc.) and generates a set of problems in operation 1202.

As the user experience management system 110 continuously receives feedback from the users as survey results from the survey result table 304 or as tickets and calls to the help desk in the ticket table 306, the user experience management system 110 can periodically (e.g., quarterly) assess the top problems (e.g., the subset of problems) that need to be addressed by the management system 104.

As the user experience management system 110 continuously monitors the resolutions implemented and updates the problems being identified accordingly, the user experience management system 110 can also perform a predictive analysis based on the updated data in the database 114. For example, as the user experience management system 110 derives trends or clusters from the data in the database 114, the user experience management system 110 can generate a prediction of the content of the tickets or the calls made to the help desk in the future by the users in the networked environment 100.

Machine Architecture

Figure 13:
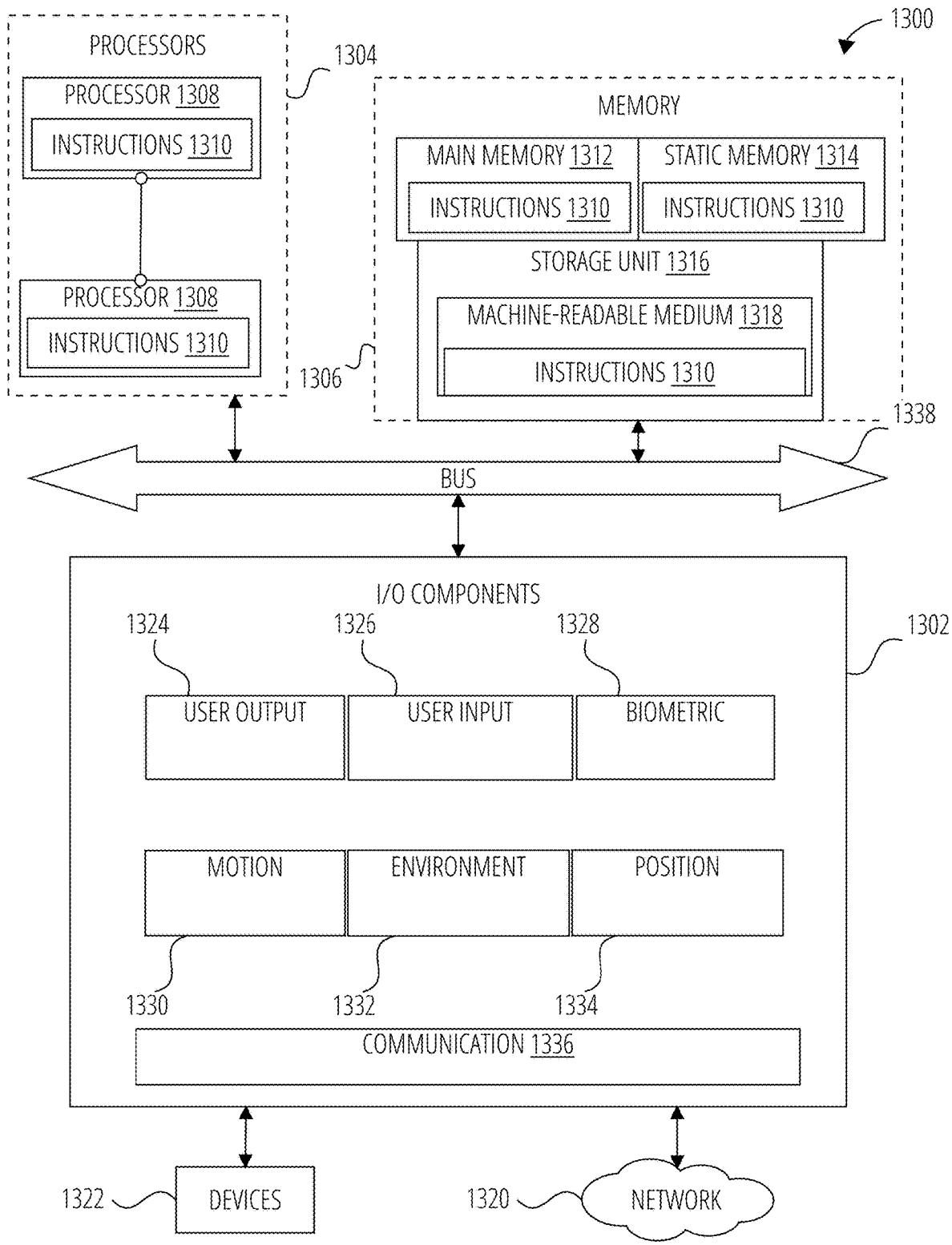
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein. The machine 1300, for example, may comprise the client device 106 or any one of a number of server devices forming part of the management system 104. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 638, which may be configured to communicate with each other via a bus 1338. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1308 that execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1312, a static memory 1314, and a storage unit 1316, both accessible to the processors 1304 via the bus 1338. The main memory 1306, the static memory 1314, and storage unit 1316 store the instructions 1310 embodying any one or more of the methodologies or functions described herein. The instructions 1310 may also reside, completely or partially, within the main memory 1312, within the static memory 1314, within machine-readable medium 1318 within the storage unit 1316, within at least one of the processors 1304 (e.g., within the Processor's cache memory), or any suitable combination thereof, during execution thereof by the machine 1300.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1302 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front and rear cameras may, for example, be used to capture still images and video of a user of the client device 106. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1336 operable to couple the machine 1300 to a network 1320 or devices 1322 via respective coupling or connections. For example, the communication components 1336 may include a network interface Component or another suitable device to interface with the network 1320. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1312, static memory 1314, and memory of the processors 1304) and storage unit 1316 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1320, using a transmission medium, via a network interface device (e.g., a network interface component included in the communication components 1336) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1322.

Software Architecture

Figure 14:
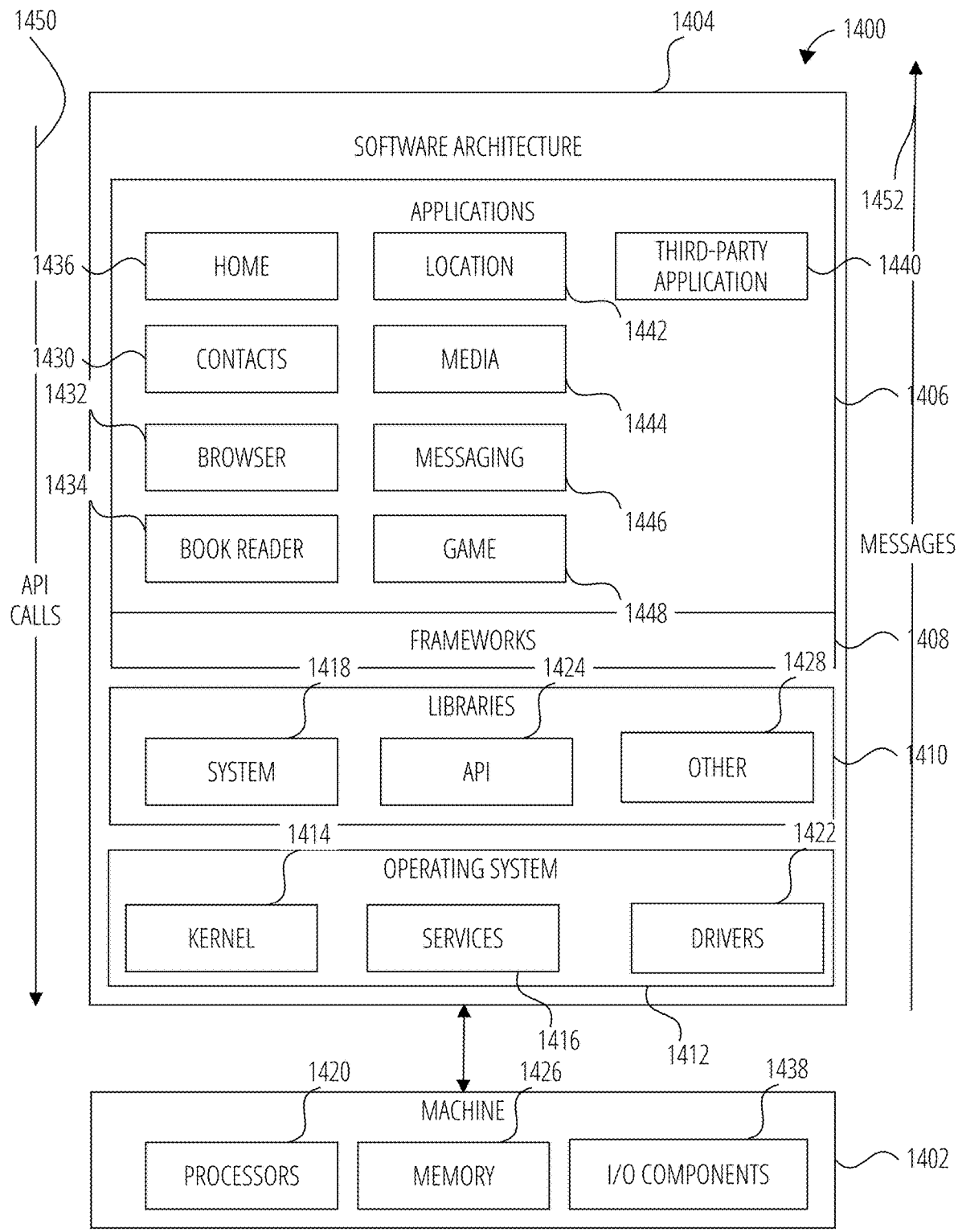
FIG. 14 is a block diagram showing a software architecture within which examples may be implemented.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1410 provide a common low-level infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a common high-level infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across several machines. In some example embodiments, the processors or processor-implemented components may be located in a single geographic location (e.g., within a home environment, an office environment, or a server farm). In other example embodiments, the processors or processor-implemented components may be distributed across several geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method comprising:
receiving training data comprising a bag of words representation of text, a mapping of words to an identification of each word, and an estimated quantity of topics, the estimated quantity of topics being based on a predetermined topic probability and predetermined word probability;
training a machine learning model based on the training data to infer a topic distribution of a corpus comprising survey information and to estimate problems, the training of the machine learning model comprising:
  comparing one or more trends observed between responses to surveys and contents of tickets and calls;
  identifying problems based on the one or more trends; and
  building the machine learning model based on the identified problems;
generating, by the machine learning model using a processor, a set of problems at a predetermined frequency based on free-form comments data in a databased of a computer, wherein data in the database comprises results of surveys, data on tickets and calls, and data on system monitoring;
generating, for display, an output of the machine learning model in response to generating the set of problems, the output comprising a plurality of geometric shapes each representing a different topic in a plurality of topics included in the output of the machine learning model, a first of the plurality of geometric shapes having a first size corresponding to a first quantity of words associated with a first topic, a second of the plurality of geometric shapes having a second size corresponding to a second quantity of words associated with a second topic;
selecting a subset of problems from the set of problems based on a priority matrix and criteria;
generating a message comprising a problem definition and a prioritization based on the subset of problems;
transmitting the message to a product management system;
analyzing a resolution generated by the product management system; and
monitoring the resolution, wherein monitoring the resolution includes performing system monitoring and storing data associated with the resolution in the database.
2. The method of claim 1, wherein the machine learning model comprises a neural network, further comprising:
storing a record of the subset of problems in the database.

3. The method of claim 1, wherein the machine learning model comprises a Latent Dirichlet Allocation model, and wherein the problem definition and the prioritization are further based on the data from the database or the priority matrix.

4. The method of claim 1, further comprising:
displaying, together with the plurality of geometric shapes, a first horizontal bar that represents a frequency of a word in the corpus and a second horizontal bar extending from the first horizontal bar that represents an estimated number of times the word is generated by the first topic.

5. The method of claim 1, further comprising:
performing root cause analysis and user experience research; and
transmitting the results of the root cause analysis and the user experience research to the product management system.

6. The method of claim 1, further comprising:
generating a score based on the results of surveys, wherein the score is based on a score associated with Satisfaction, a score associated with Ease-of-Use, and a score associated with Reliability.

7. The method of claim 6, further comprising:
generating a target score that is a sum of the score and a product of a room for improvement (RFI) score and a Relative Standard Deviation (RSD).

8. A non-transitory computer-readable storage medium having instructions stored thereon, that when executed by a computer, cause the computer to perform operations comprising:
receiving training data comprising a bag of words representation of text, a mapping of words to an identification of each word, and an estimated quantity of topics, the estimated quantity of topics being based on a predetermined topic probability and predetermined word probability;
training a machine learning model based on the training data to infer a topic distribution of a corpus comprising survey information and to estimate problems, the training of the machine learning model comprising:
comparing one or more trends observed between responses to surveys and contents of tickets and calls;
identifying problems based on the one or more trends; and
building the machine learning model based on the identified problems;
generating by the machine learning model a set of problems at a predetermined frequency based on data in a database of a computer, wherein data in the database comprises results of surveys, data on tickets and calls, and data on system monitoring;
generating, for display, an output of the machine learning model in response to generating the set of problems, the output comprising a plurality of geometric shapes each representing a different topic in a plurality of topics included in the output of the machine learning model, a first of the plurality of geometric shapes having a first size corresponding to a first quantity of words associated with a first topic, a second of the plurality of geometric shapes having a second size corresponding to a second quantity of words associated with a second topic;
selecting a subset of problems from the set of problems based on a priority matrix and criteria;
generating a message comprising a problem definition and a prioritization based on the subset of problems;
transmitting the message to a product management system;
analyzing a resolution generated by the product management system; and
monitoring the resolution, wherein monitoring the resolution includes performing system monitoring and storing data associated with the resolution in the database.

9. The method of claim 1, wherein the plurality of geometric shapes comprises circles.

10. The method of claim 1, wherein a distance between the first and second geometric shapes represents a measure of relatedness between the words associated with the first topic and the words associated with the second topic.

11. The method of claim 1, further comprising pre-processing the free-form comments by:
setting text in the free-form comments to lowercase characters;
tokenizing the text into individual words;
removing numbers from the text while retaining words that include numbers;
grouping together different inflected forms of a word into a single item; and
generating one or more bigrams based on the tokenized text.

12. The computer-readable storage medium of claim 8, wherein the computer to perform operations further comprising:
obtaining data associated with the problem definition from the database.

13. The computer-readable storage medium of claim 8, wherein the computer to perform operations further comprising:
performing root cause analysis and user experience research; and
transmitting the results of the root cause analysis and the user experience research to the product management system.

14. The computer-readable storage medium of claim 8, wherein the computer to perform operations further comprising:
generating a score based on the results of surveys, wherein the score is based on a score associated with Satisfaction, a score associated with Ease-of-Use, and a score associated with Reliability.

15. The computer-readable storage medium of claim 14, wherein the computer to perform operations further comprising:
generating a target score that is a sum of the score and a product of a room for improvement (RFI) score and a Relative Standard Deviation (RSD).

16. A system comprising:
a processor; and
a memory storing instructions that, when executed by the processor, cause the processor to perform operations comprising:
receiving training data comprising a bag of words representation of text, a mapping of words to an identification of each words, and an estimated quantity of topics, the estimated quantity of topics being based on a predetermined topic probability and predetermined word probability;
training a machine learning model based on the training data to infer a topic distribution of a corpus comprising survey information and to estimate problems, the training of the machine learning model comprising:
  comparing one or more trends observed between responses to surveys and contents of tickets and calls;
  identifying problems based on the one or more trends; and
  building the machine learning model based on the identified problems;
generating by the machine learning model a set of problems at a predetermined frequency based on data in a database of a computer, wherein data in the database comprises results of surveys, data on tickets and calls, and data on system monitoring;
generating, for display, an output of the machine learning model in response to generating the set of problems, the output comprising a plurality of geometric shapes each representing a different topic in a plurality of topics included in the output of the machine learning model, a first of the plurality of geometric shapes having a first size corresponding to a first quantity of words associated with a first topic, a second of the plurality of geometric shapes having a second size corresponding to a second quantity of words associated with a second topic;
selecting a subset of problems from the set of problems based on a priority matrix and criteria;
generating a message comprising a problem definition and a prioritization based on the subset of problems;
transmitting the message to a product management system;
analyzing a resolution generated by the product management system; and
monitoring the resolution, wherein monitoring the resolution includes performing system monitoring and storing data associated with the resolution in the database.

17. The system of claim 16, wherein the processor to perform operations comprising:
  storing a record of the subset of problems in the database; and
  obtaining data associated with the problem definition from the database.

18. The system of claim 16, wherein the problem definition and the prioritization are further based on the data from the database or the priority matrix.

19. The system of claim 16, wherein the processor to perform operations comprising:
  perform root cause analysis and user experience research; and
  transmit the results of the root cause analysis and the user experience research to the product management system.

20. The system of claim 16, wherein the processor to perform operations comprising:
  generate a score based on the results of surveys, wherein the score is based on a score associated with Satisfaction, a score associated with Ease-of-Use, and a score associated with Reliability; and
  generate a target score that is a sum of the score and a product of a room for improvement (RFI) score and a Relative Standard Deviation (RSD).

* * * * *